J. D. STEWART.
Tobacco Pipe.
No. 46,598.
Patented Feb. 28, 1865.
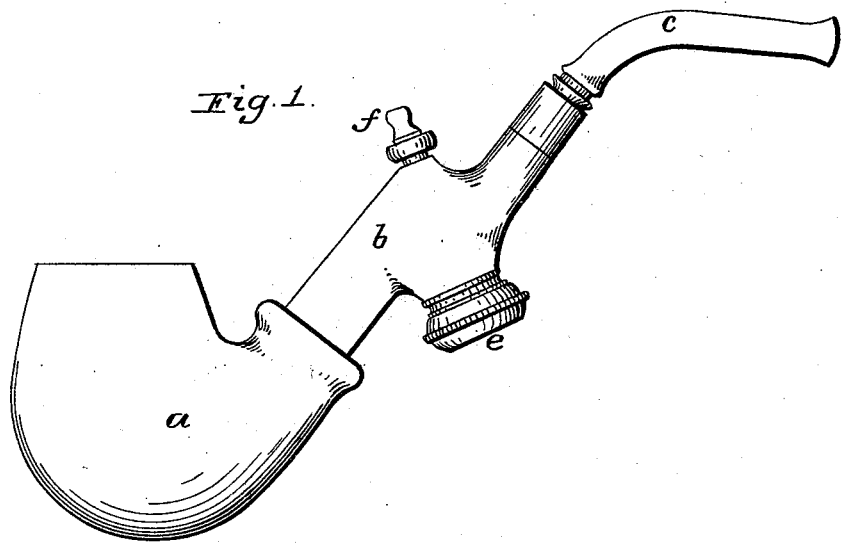
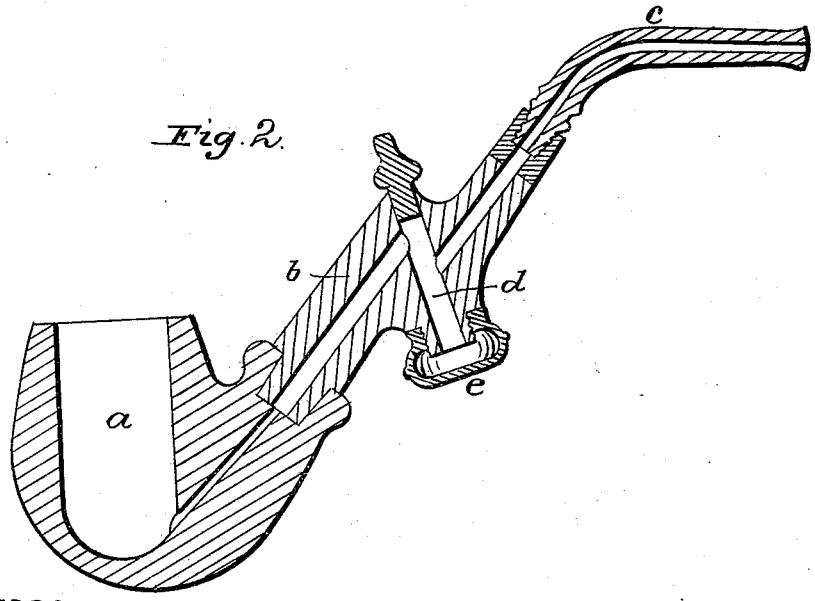

UNITED STATES PATENT OFFICE.

JOHN D. STEWART, OF BALTIMORE, MARYLAND.

SMOKING-PIPE.

Specification forming part of Letters Patent No. 46,598, dated February 28, 1865.

*To all whom it may concern:*

Be it known that I, JOHN D. STEWART, of the city of Baltimore and State of Maryland, have invented a new and useful Improvement in Tobacco-Pipes; and I do hereby declare that the following is a full and exact description thereof, reference being had to the accompanying drawings, which form a part of this specification.

Figure 1 is a side view of my improved tobacco-pipe, and Fig. 2 is a longitudinal central section of the same.

It is well known to all smokers that the stems of the ordinary tobacco-pipes rapidly fill up and become useless from the condensation therein of the saliva, nicotine, and other impurities. It is also well known that in the use of the aforesaid pipes very injurious effects are produced by the inhalation of the nicotine with the tobacco-smoke.

By practical experiments I have discovered that my invention of a trap, $d$, in the stem $b$ of a tobacco-pipe, between the bowl $a$ and the mouth-piece $c$ of the same, having outlet-apertures formed in the upper and lower ends thereof, which are closed by means of suitable caps, plugs, or other removable devices, gives to the user of my improved pipe the power of readily and completely remedying all the imperfections above alluded to in the ordinary tobacco-pipe.

When my improved tobacco-pipe is in practical use, the saliva will find its way into the bottom of the trap $d$, and thereby leave the smoke-passage perfectly clear for the flow of the smoke through the same. As the lower end of the trap $d$ will necessarily be considerably lower in temperature than the direct smoke-passage in the stem $b$, the nicotine in the smoke will be arrested and condensed in the said trap.

After using my improved pipe, the stem can be perfectly cleaned by opening the apertures in the opposite ends of the trap $d$ and blowing through the same, or by the use therein of any suitable cleaning swab or brush.

The devices employed for closing the openings to the trap $d$ of my improved tobacco-pipe may be made of any ornamental shape that taste or fancy may suggest.

For the purpose of facilitating the cleansing of the trap $d$ and making it a better condenser of the nicotine, I shall sometimes line the same with metal.

What I claim as my invention, and desire to secure by Letters Patent, is—

1. Giving such a shape to the stem $b$ of a tobacco-pipe as to form a trap, $d$, in the smoke-passage thereof, for the purpose herein described.

2. The openings to the aforesaid trap $d$, in connection with the removable devices for closing the same, substantially as described, and for the purpose herein set forth.

The above specification of my improved tobacco-pipe signed and witnessed this 31st day of January, 1865.

JNO. D. STEWART.

Witnesses:
JAMES E. WILLIAMS,
Z. C. ROBBINS.